Dec. 22, 1959     H. A. EDMONDS ET AL     2,918,161
CONVEYOR SYSTEM
Filed June 19, 1957     4 Sheets-Sheet 1

Inventors
Harvey A. Edmonds
Clifford E. Evarson
William S. Gilbert
Dalbert U. Shefte
Attorney

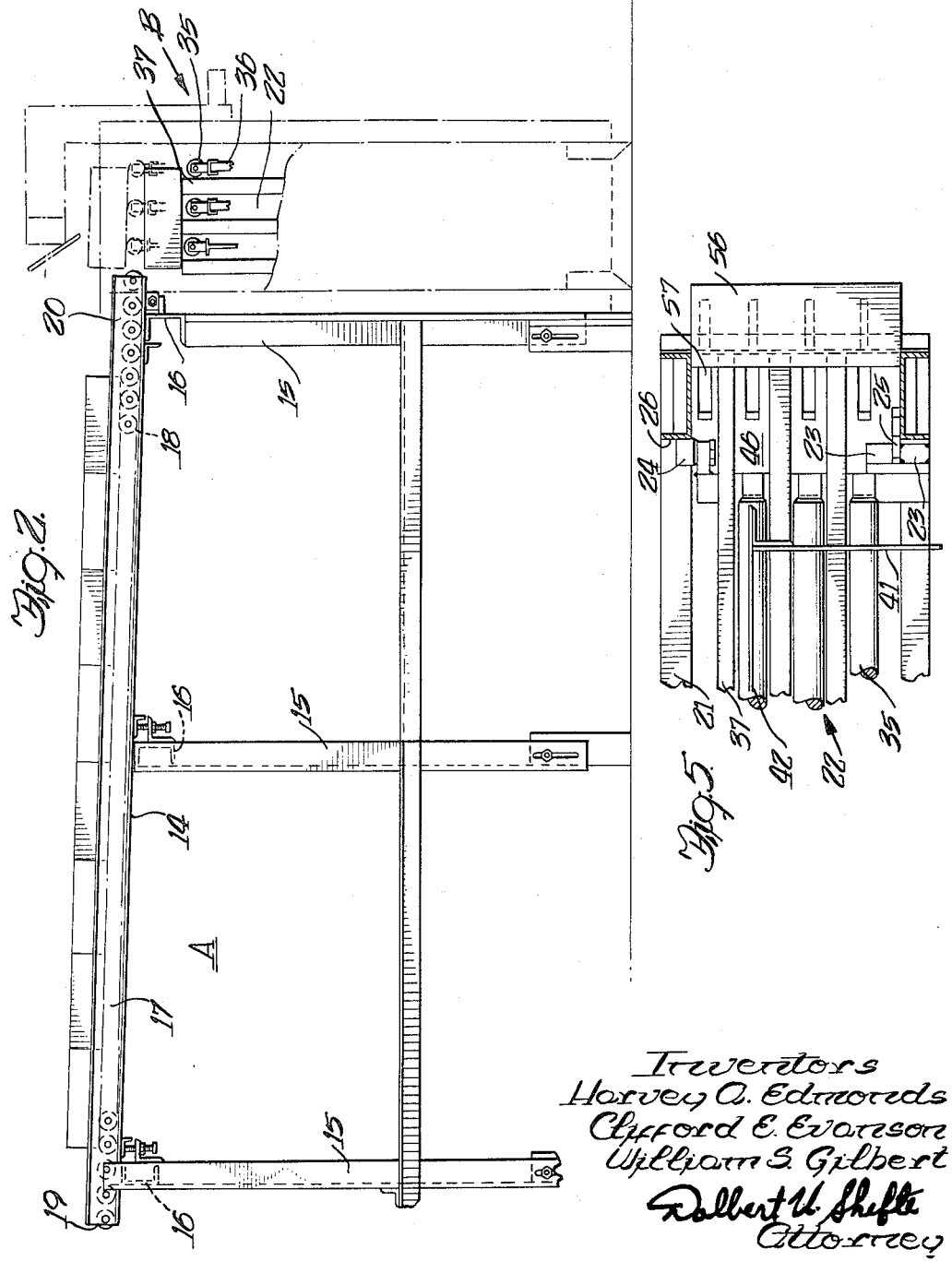

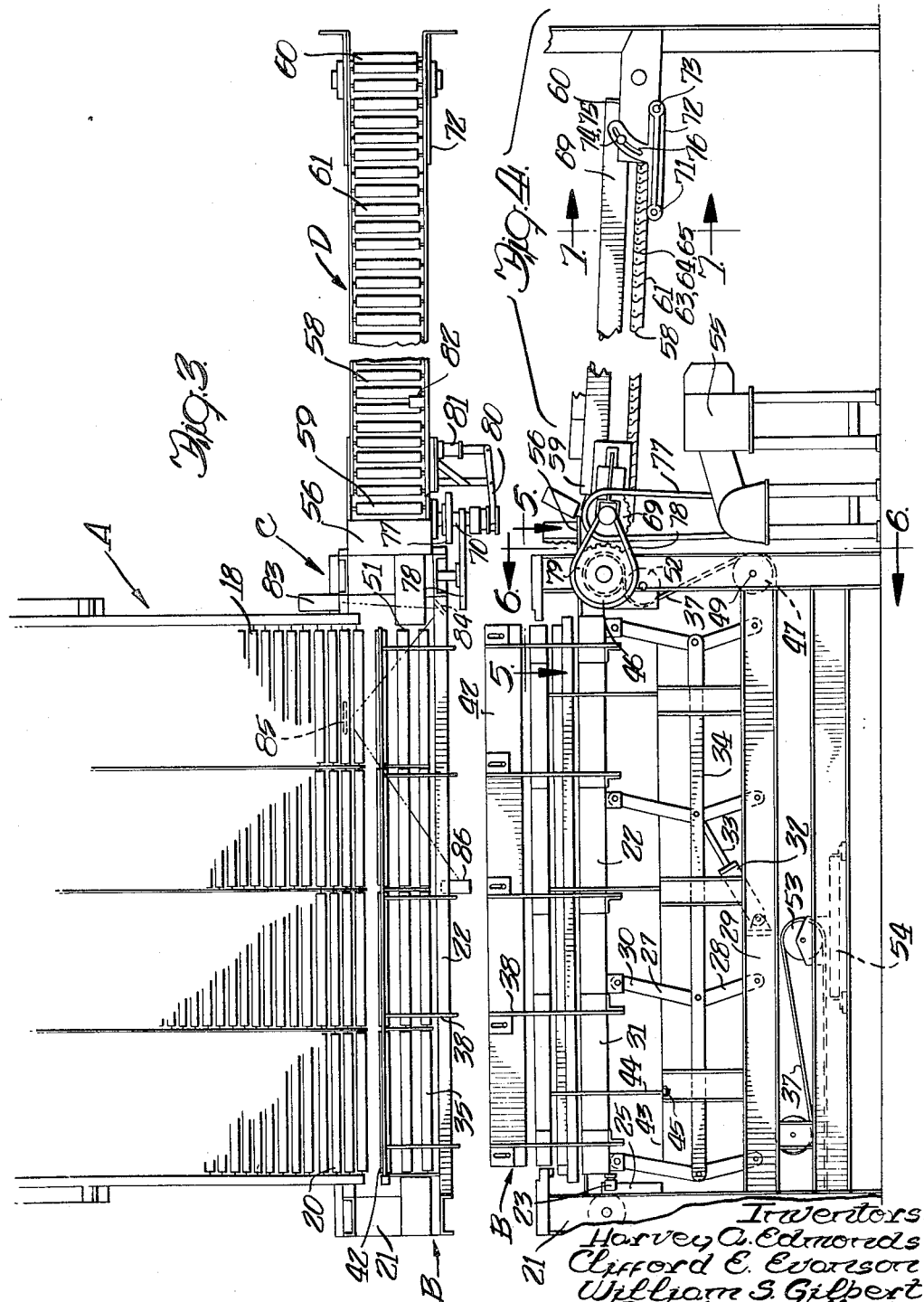

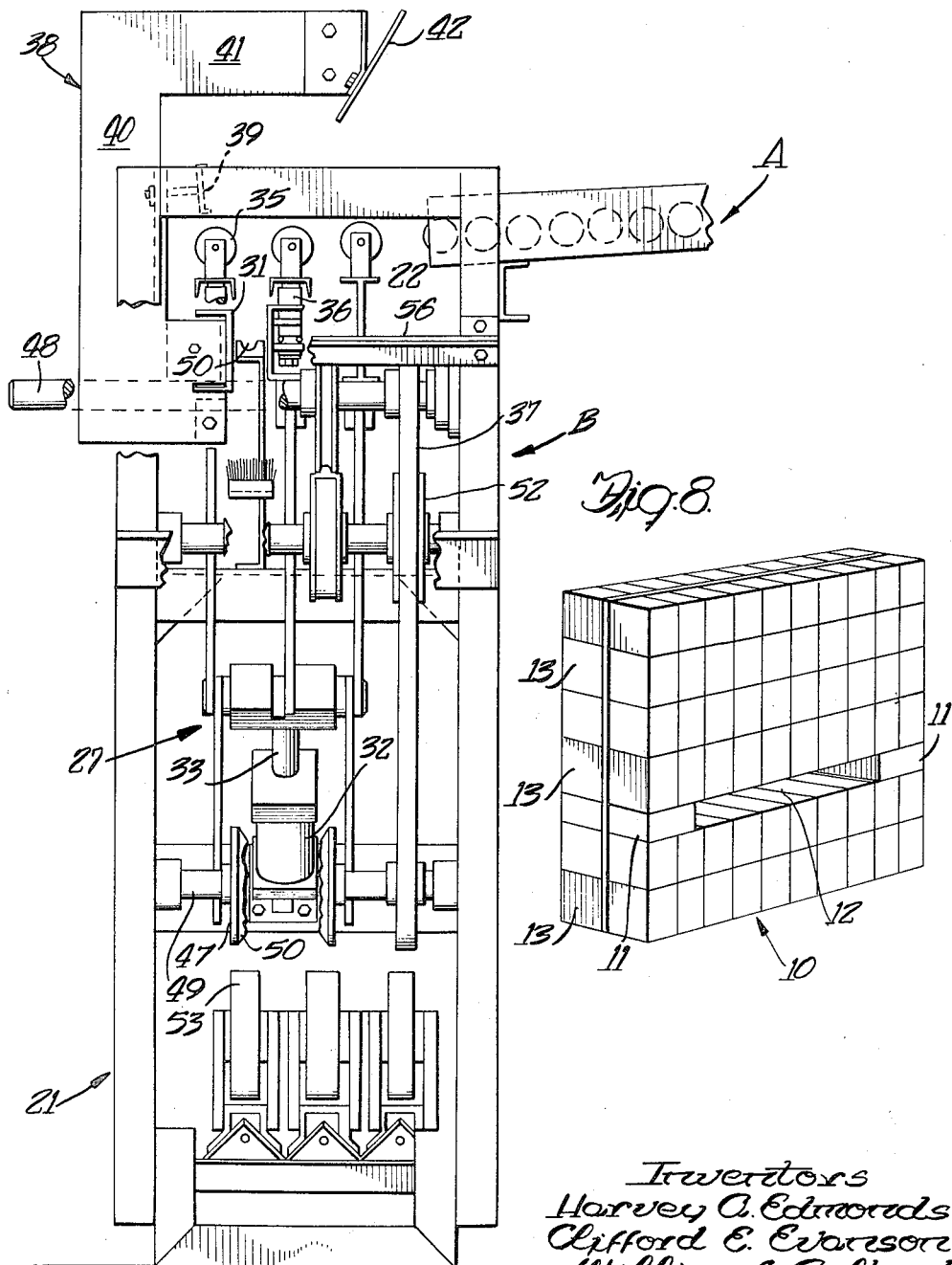

United States Patent Office 2,918,161
Patented Dec. 22, 1959

2,918,161

CONVEYOR SYSTEM

Harvey A. Edmonds and Clifford E. Evanson, Chicago, and William S. Gilbert, Lincolnwood, Ill., assignors to Structural Clay Products Research Foundation Application June 19, 1957, Serial No. 667,075

7 Claims. (Cl. 198—32)

This invention relates to a conveyor system and more particularly to a conveyor system on which rows of units are initially conveyed in a direction perpendicular to the length of each row, the movement subsequently changing to a direction parallel to the length of each row and each individual unit being pivoted upon its side.

In the modern era of automation, the ultimate goal in material handling problems, such as on production lines, is to eliminate manual operation to the point that a machine can accomplish the entire moving and positioning of units without human attention.

Often in production line or material handling operations, the unit which is being worked upon or handled must be turned to face a different direction with respect to its movement, and/or must be pivoted to rest upon a different surface.

The apparatus of the present invention, as seen in Fig. 1, accomplishes both the displacement of a unit relative to the direction of movement and the pivoting of the unit. The apparatus includes a unit advancing section A on which rows of units are loaded and move in a direction perpendicular to the length of the rows. A direction changing section B receives the rows from the unit advancing section and moves them in a direction parallel to the length of the rows. As the units are conveyed away from the direction changing section, they pass through the unit turning section C where they are turned upon their side for further conveyance on the unit discharging section D. Thus the position of a unit relative to the direction of its movement is changed so that what was the front is now at the side and what was one of the sides is now the bottom.

This invention is susceptible to a wide range of applications in the conveyor art where it is often desirable to change the relative position of the work unit on the conveyor so as to place the unit in position for further work thereon or in proper position for discharge. The turning feature has application to situations where the units must be turned to expose a new surface and it is apparent that with a combination of direction changing sections and turning sections the position of a unit can be universally changed as desired.

The particular embodiment illustrated and described herein is directed to use in a brick packaging conveyor structure wherein brick or other clay products are automatically stacked and strapped to form an easily transportable pack such as the 62 brick package 10 of Fig. 8 which has been developed by the Structural Clay Products Research Foundation and is disclosed in U.S. Letters Patent No. 2,778,491 issued January 22, 1957. In this package two spacer brick 11 are positioned to provide an opening 12 in the completed pack through which the tongs of a lift truck or some other handling device can be inserted. The present invention provides a conveyor system for supplying these spacer brick to the packaging line. In order to reduce labor time, spacer brick are manually loaded onto the conveyor in the fastest way possible, which is by a clamp that deposits them in an upright position in parallel rows. Thus, the conveyor is constructed to perform the operation of properly positioning the spacer brick for insertion into the packaging assembly line.

The principal object of this invention is to provide a new and improved conveyor system for transporting units.

Another object of the present invention is to provide a new and improved conveyor system on which rows of units traveling perpendicular to the length of the rows are changed in their direction of movement to travel parallel to the length of the rows.

A further object of the present invention is to provide a new and improved conveyor system on which individual units are turned about a horizontal axis.

Still another object of the present invention is to provide a new and improved conveyor system which changes the direction of movement of rows of units transported thereon from a direction perpendicular to the length of the rows to a direction parallel to the length of the rows and also turns each individual unit about a horizontal axis perpendicular to the direction of movement.

A still further object is to provide a new and improved conveyor system wherein rows of units moving perpendicular to the length of the rows are deposited on an elevator which lowers the rows onto a conveyor which in turn transports the units in a direction parallel to the length of the rows.

Yet another object of the present invention is to provide a new and improved conveyor system having a unit turning plate onto which units are conveyed, and off the free end of which the units pivotally fall onto a discharge conveyor.

Other and further objects and advantages will be apparent from the following descriptions and drawings in which:

Fig. 3 is a top plan view of the conveyor system of Fig. 1;

Fig. 4 is a side elevational view of the structure of Fig. 3;

Fig. 5 is a horizontal sectional view taken along line 5—5 of Fig. 4;

Fig. 6 is a vertical sectional view partially broken away taken along line 6—6 of Fig. 4 with the belts not shown;

Fig. 7 is a vertical sectional view taken along line 7—7 of Fig. 4; and

Fig. 8 is a perspective view of a package of 62 brick.

Figure 1:
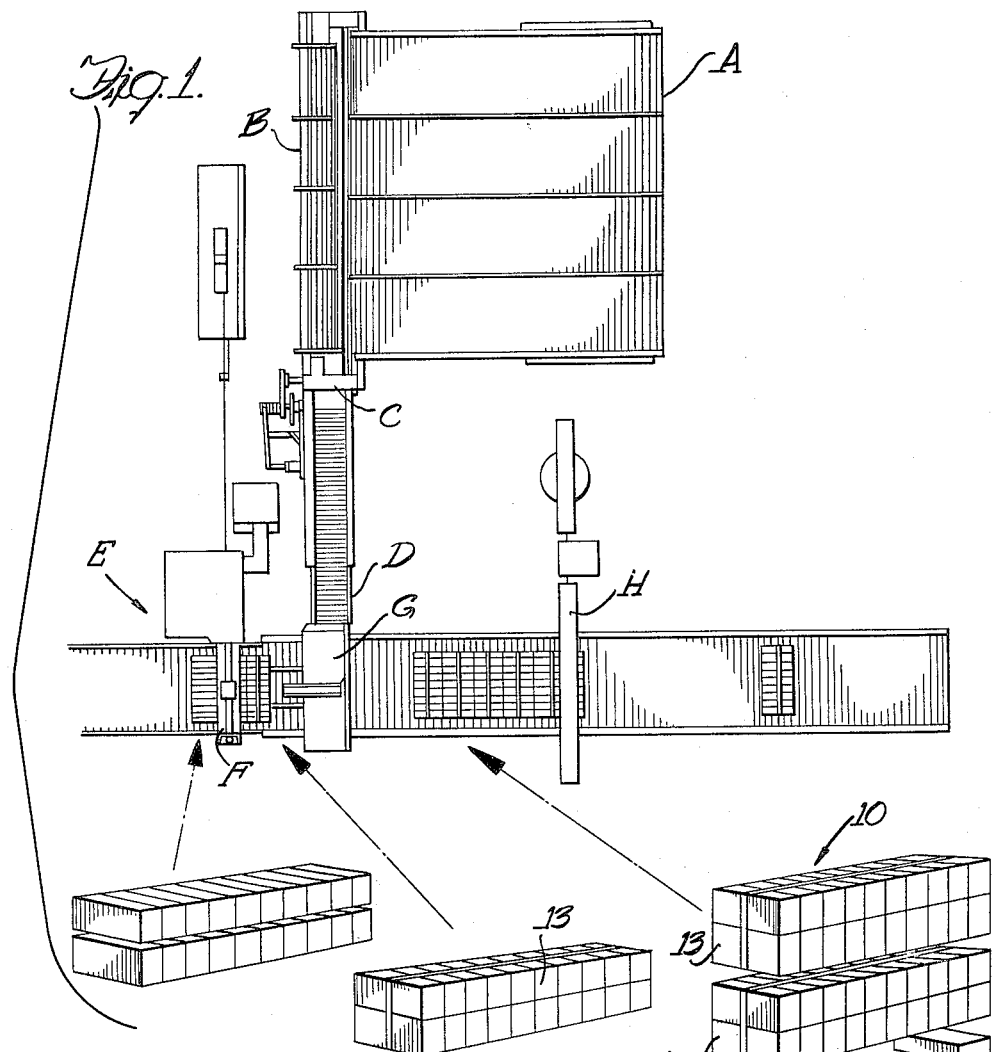
Fig. 1 is a general top plan view of a conveyor system according to one embodiment of the present invention and including a diagrammatic representation of the adjacent portions of the packaging line.
Figure 2:
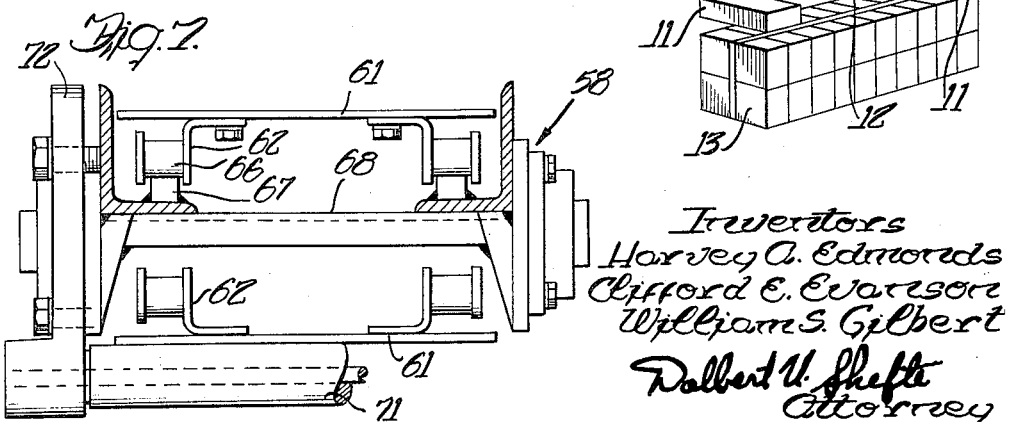
Fig. 2 is a vertical end view of the conveyor system of Fig. 1.

While this invention is susceptible of embodiments in many different forms, there is shown in the drawings and will herein be described in detail several embodiments with the understanding that the present disclosure is to be considered as an exemplification of the principles of the invention and is not intended to limit the invention to the embodiment illustrated. The scope of the invention will be pointed out in the appended claims.

As mentioned above, the purpose of the embodiment illustrated is to convey brick 11 loaded thereon to the packaging line E and in so doing, displace the brick so as to present them in proper position to be fed into the accumulation of brick to form the 62 brick pack 10. The brick on the packaging line are accumulated in sub-packs 13 of 20 brick each in a 2-tier stack which is strapped together in a first strapper indicated as F in Fig. 1. These sub-packs are conveyed to the stacker assembly G, which accumulates two sub-packs in a raised position and drops spacer brick 11 onto a third sub-pack which is then combined with the first two sub-packs to form the full pack. This full pack then passes through the second strapper H in which it is strapped to form the completed package as illustrated in Fig. 8.

As previously indicated, the present structure consists of a unit advancing section A, a direction changing section B, a unit turning section C, and a discharge section D, all of which are interconnected and intercontrolled to form an automatic system for conveying units and repositioning the units in a desired manner.

The unit advancing section A consists of an inclined bed 14 which is supported on legs 15. The bed consists of transverse rods 16 to which a plurality of parallel roller supporting members 17 are secured. Freely rotatable horizontal rollers 18 are mounted between the supporting members 17 for the conveyance of brick 11. The bed 14 declines from a loading end 19 to a discharge end 20 adjacent the direction changing section B, the inclination being sufficient to permit brick to gravitate on the rollers from the loading end to the discharging end.

The direction changing section B consists of a supporting framework 21 within which an elevator 22 is mounted for vertical movement. The elevator is restricted to vertical movement by sets of guide rollers 23 and 24 which engage vertical guide plates 25 and 26 attached to the supporting framework 21. Each end of the elevator has a first set 23 of these guide rollers mounted with their axes transverse to the axes of the rollers of the second set 24. The rollers abut the vertical guide plates of the supporting framework 21. The rollers of the first set are mounted in pairs and engage the guide plates therebetween. The rollers of the second set at each end cooperate with the rollers of the second set at the other end to engage the limiting plates. Thus the elevator 22 is prevented from moving in a horizontal direction.

The elevator is raised and lowered by a plurality of toggle joints 27, one fixed end 28 of each toggle joint being connected to a cross piece 29 of the supporting framework 21 and the other end 30 of each toggle joint being attached to the bottom of the elevator bed 31. The toggle joints 27 are operated by a hydraulic cylinder 32 and piston 33 connected to one toggle joint and linked to the other toggle joints by a drive link 34. The toggle joints 27 also serve to maintain the elevator 22 in a horizontal plane.

The elevator bed 31 has a plurality of horizontal rollers 35 on posts 36 extending upwardly therefrom. All but one of the posts are adjustable to vary the angle of the plane of the rollers. These rollers are similar to the rollers 18 on the advancing section A and are positioned in a plane having the same inclination as the plane of the rollers 18 of the advancing section A so as to be coplanar therewith when in the raised position for the receipt of brick therefrom. The rollers 35 are spaced apart a distance to permit lowering of the elevator to a position below the top of conveyor belts 37 which will be described below. A plurality of inverted L supports 38 are secured to the elevator bed 31 and extend thereabove. These L supports 38 are mounted so as not to interfere with movement of brick 11 on the elevator. A vertical stop bar 39 is adjustably attached to the vertical legs 40 of the L supports and extends along the elevator 22 above the rollers 35 to permit only a single row of brick to gravitate from the advancing section A. The bars 39 are adjustable to accommodate various size brick.

Attached across the free ends of the horizontal legs 41 of the inverted L supports 38 is an inclined stop plate 42 which moves with the elevator 22 so that when the elevator is lowered from the loading position it engages the first row of brick on the advancing section so as to prevent movement of more brick onto the elevator until the elevator is once again raised. As seen in Fig. 6, this plate 42 is inclined at approximately 30° to the vertical so as to void chopping or otherwise damaging the brick on the advancing section A.

The stroke of the elevator is limited in the downward direction by a horizontal frame 43 fixed to the supporting framework. This frame 43 is positioned to stop the bed 31 of the elevator when the rollers 35 have been lowered below the level of the conveyor belts 37 to insure transfer of brick on the rollers 35 to the conveyor belts 37. The upward movement of the elevator 22 is limited by vertical bolts 44 which are secured to the elevator bed 31 and extend downwardly through the horizontal frame 43. Nuts 45 are attached to the lower ends of the bolts 44 to abut against the underside of the frame 43 and limit the upward motion of the elevator 22. These nuts 45 can be adjusted to properly position the uppermost station of the rollers 35 so as to be substantially in line with the rollers 18 of the inclined advancing section A.

The conveyor belts 37 mentioned above are mounted on a plurality of rollers 46, 47, 52 and 53 secured on shafts 48 and 49 extending across the supporting framework 21. The belts 37 shown in the drawings are V-belts and the rollers have notches 50 to accommodate the V-shape. The drive rollers 46 are mounted adjacent the discharge end 51 of the elevator and rotate in a direction pulling the belts toward the discharge end so as to move brick thereon out of the elevator 22. Hold-down rollers 52 are mounted directly below the drive rollers 46 to maintain the belts 37 on the drive rollers and insure proper driving of the belts. The belts extend around guide rollers 47 at the bottom of the supporting framework 21 and move to the rear over tensioning rollers 53 which are adjustably mounted on traveler rods 54. The position of these adjustable rollers 53 may be varied on the traveler rods 54 to properly tension the belts. The belts then extend around other guide rollers 47 at the bottom and top of the rear of the supporting framework for movement between the elevator rollers 31. The drive shaft 48 of the drive rollers 46 extends outwardly from the supporting framework 21 and is linked to a drive motor 55 as will be described below.

The unit turning section C is mounted at the discharge end 51 of the elevator 22 and consists of a flat horizontal plate 56 extending outwardly to a free end spaced from the supporting framework. The plate is provided with fingers 57 extending between the belts 37 and positioned slightly below the plane of the top of the belts so that brick conveyed by the belts will be deposited on the plate and subsequent brick on the belts will force the brick on the plate in the direction of the free end from which they will pivotally fall. The brick as they fall are received on the unit discharging section D for conveyance away from the turning plate 56.

The unit discharging section D consists of a slat conveyor 58 having one end 59 supported by the framework of the elevator and positioned below the turning plate 56 to receive brick 11 falling therefrom. The spacing between the plate 56 and the adjacent discharge conveyor D is important in that it must be sufficient to permit each falling brick to turn past its equilibrium point so as to come to rest on the conveyor upon its side. However, too much spacing is undesirable as it is possible to cause damage to the brick.

The other end 60 of the slat conveyor is supported on the adjacent structure, such as the portions of the packaging line E of Fig. 1. When used with the packaging line, as described above, the brick are discharged from the discharge conveyor onto the packaging line intermittently and thus, the flow of brick on the slat conveyor cannot be maintained at a constant rate. Therefore, the slat conveyor must be made of a material which will slide under the brick when the brick are stopped on the conveyor section. In the embodiment illustrated, the slats are of metal.

As seen in Figs. 4 and 7, the slat conveyor 58 consists of an endless conveyor formed from a plurality of inverted U-shaped slats 61, each leg 62 of each slat 61 having front and rear holes 63 and 64 arranged to overlay the holes on adjacent slats and be attached together by pins 65 which have small rollers 66 thereon. These rollers ride on tracks 67 extending under the slats and attached to the channel frame 68 of the conveyor. A drive sprocket 69 at the rear of the discharge conveyor controls movement thereof and in turn is driven by a drive shaft 70 connected to the drive motor 55.

To properly tension the slat conveyor 58 a tensioning roller 71 is mounted on a bracket 72 which is pivotally secured to the discharge end of the discharge conveyor section. The tensioning roller 71 is adjustable by pivoting the bracket 72 about the rod 73 which is attached to the conveyor section thereby raising and lowering the tensioning roller 71 to take up slack in the slat conveyor. The bracket 72 is locked in an adjusted position by tightening a nut 74 on a lug 75 attached to the conveying section and which extends through an arcuate slot 76 in the bracket 72.

Both the slat conveyor 58 and the conveyor belts 37 can be driven by a single drive motor 55, such as a one-half horsepower electric motor as seen in the drawings. This motor is connected to the drive shaft 70 of the slat conveyor by a drive belt 77 and to the drive rollers 46 of the direction changing section B by a link belt 78 and sprocket 79 which is engageable with the drive shaft of the drive rollers of the conveyor belts by a simple clutch link 80 controlled by a solenoid 81. The slat conveyor operates continuously but the solenoid is operated by switches 82 in the slat conveyor sensitive to a back-up of brick thereon to stop the feed of brick onto the discharge conveyor section D. The elevator operation is controlled by a photoelectric cell 83 mounted adjacent the turning plate 56. A beam is cast across the plate and is reflected by a first mirror 84 rearwardly across the rollers 35 of the elevator 22 to a second mirror 85 which again reflects the beam rearwardly across the rollers 35 to a second photoelectric cell 86. The beam extends rearwardly so that it will be interrupted by brick positioned at various points on the elevator. Thus, the beam will be uninterrupted only when the elevator is completely empty and when the beam is uninterrupted the photoelectric cells energize the hydraulic cylinder 32 to raise the elevator 22 to the brick receiving position. A time delay (not shown) for a period such as 5 seconds, holds the elevator 22 in a raised position while it is being loaded, after which time the elevator moves to the lowered or brick discharging postion and the brick are deposited on the moving belts 37 for discharge off the turning plate 56 onto the slat conveyor 58.

In operation brick are loaded onto the unit advancing section A manually in rows and these rows of brick move onto the raised elevator 22 one row at a time by operation of the elevator and controls therefor. When a row of brick has moved onto the elevator, the elevator is lowered and the brick are discharged by the conveyor belts 37 across the turning plate 56 from which they fall onto the discharge section D. When all of the brick have moved off the elevator, the photoelectric beam is uninterrupted and the elevator is raised once again for another row of brick.

When brick pile up on the slat conveyor 58, the belts 37 of the direction changing section are stopped to prevent further discharge onto the slat conveyor until such time as the brick once again progress on the slat conveyor.

Thus the present invention provides a wholly automatic mechanism for conveying units such as brick from a loading station to a discharge station and while being transported, the position of each brick may be changed as desired by combining direction changing sections and turning sections.

We claim as our invention:

1. An apparatus in a conveyor system for changing the direction of movement of a row of units on a conveyor system from a direction perpendicular to the length of the row to a direction parallel to the length of the row, said apparatus comprising: a supporting structure; a supply section on which rows of units are advanced perpendicular to the length of the rows; an elevator section mounted on the supporting structure and movable from a unit receiving to a unit discharging position and having mounted thereon freely rotatable rollers parallel to the rows of units, said rollers being spaced apart and in a plane declining away from the supply section to permit a row of units to gravitate onto the rollers, a stop member on the elevator section to stop each row when wholly supported on the rollers, and a control member on the elevator permitting one row of units to be received on the rollers when the elevator is in the receiving position and moving with the elevator to prevent rows from advancing onto the rollers when the elevator is in the discharge position; means for moving the elevator section from a unit receiving to a unit discharging position; discharge conveyors extending into the spaces between rollers, the rollers being above the discharge conveyors when in the receiving position and being below the discharge conveyors when in the discharge position thereby depositing the rows of units onto the discharge conveyors; means for operating said discharge conveyors to move the row of units in a direction parallel with the length of the unit; and control means preventing movement of the elevator from the discharge position until all units of the row have passed out of the path of the rollers.

2. The apparatus for changing the direction of movement of a row of units on a conveyor system from a direction perpendicular to the length of the row to a direction parallel to the length of the row, of claim 1, wherein the means for raising and lowering the elevator section include a toggle joint having an end of one link pivotally secured to the supporting structure and an end of the other link pivotally secured to the elevator structure.

3. A conveyor system for transporting units, comprising: a unit loading section upon which units may be placed in rows and having means for advancing said rows in a direction perpendicular to the length of the rows; an elevator supporting structure; an elevator section mounted on said supporting structure and having spaced rollers mounted thereon parallel to the rows for receipt of rows of units, the rollers being movable from a position adjacent the loading section to a lowered position, the elevator supporting structure having spaced conveyor portions mounted thereon and between which the rollers of the elevator are lowered thereby transferring the rows of units from the rollers to the conveyor portions, said conveyor portions extending beyond the ends of the rollers for conveyance of the rows of units away from the elevator in a direction parallel to the rows; a stop member movable with the elevator to prevent units from passing from the loading section to the elevator when the elevator is lowered; means for raising and lowering the elevator; drive means for intermittently operating the conveyor portions; a flat plate adjacent the conveyor portions over which units are pushed from the conveyor portions by the preceding units on the conveyor portions, said plate having a free end from which the units pivotally fall; a discharge conveyor section having a unit receiving portion spaced below the free end of the plate for receipt of units after they have pivoted; and drive means for continuously operating the discharge conveyor section thereby conveying units away from the unit receiving portion.

4. A conveyor system for transporting units, comprising: a unit loading section upon which units may be placed in rows and having means for advancing said rows in a direction perpendicular to the length of the rows; an elevator supporting structure; an elevator section mounted on said supporting structure and having spaced rollers mounted thereon parallel to the rows for receipt of rows of units, the rollers being movable from a position adjacent the loading section to a lowered position, the elevator supporting structure having spaced conveyor portions mounted thereon and between which the rollers of the elevator are lowered thereby transferring the rows of units from the rollers to the conveyor portions, said conveyor portions extending beyond the ends of the rollers for conveyance of the rows of units away from the elevator in a direction parallel to the rows; a stop member movable with the elevator to prevent units from passing from the loading section to the elevator when the elevator is lowered; means for raising and lowering the elevator; drive means for intermittently operating the conveyor portions; a flat plate adjacent the conveyor portions over which units are pushed from the conveyor portions by the preceding units on the conveyor portions, said plate having a free end from which the units pivotally fall; a discharge conveyor section having a unit receiving portion spaced below the free end of the plate for receipt of units after they have pivoted; drive means for continuously operating the discharge conveyor section thereby conveying units away from the unit receiving portion; control means sensitive to the position of units on the apparatus stopping the means for operating the conveyor portions when units accumulate on the unit receiving portion of the discharge conveyor, actuating the means for operating the conveyor portions when the units are conveyed away from the unit receiving portion, actuating the means for raising the elevator when there are no units on the conveyor portions in the path of the rollers, and actuating the means for lowering the elevator after sufficient time has elapsed for a row of units to be received on the rollers of the elevator.

5. In a conveyor system for changing the direction of movement of a row of units, the combination of a supporting structure; a supply section on which a row of units is advanced perpendicular to the length of the row; an elevator section mounted on the supporting structure and movable from a unit receiving to a unit discharging position and having mounted thereon elongated receiving elements parallel to the row of units and spaced apart transversely of the row to receive a row of units advancing from said supply section, a stop member on the elevator section to stop each row when wholly supported on said elements, and a control member on the elevator permitting one row of units to be received on said elements when the elevator is in the receiving position and moving with the elevator to prevent rows from advancing onto the elements when the elevator is in the discharge position; means for moving the elevator section from a unit receiving to a unit discharging position; discharge conveyor members extending into the spaces between said receiving elements, the elements being above the discharge conveyor members when in the receiving position and being below the discharge conveyor members when in the discharge position thereby depositing the rows of units onto the discharge conveyor members; and means for operating said discharge conveyor members to move the row of units in a direction parallel with the lentgh of the unit; and control means preventing movement of the elevator from the discharge position until all units or the row have passed out of the path of the elements.

6. In a conveyor system for changing the direction of movement of a row of units, the combination of a supporting structure; a supply section on which a row of units is advanced perpendicular to the length of the row; an elevator section mounted on the supporting structure and movable from a unit receiving to a unit discharging position and having mounted thereon elongated receiving elements parallel to the row of units and spaced apart transversely of the row to receive a row of units advancing from said supply section, a stop member on the elevator section to stop each row when wholly supported on said elements, and a control member on the elevator permitting one row of units to be received on said elements when the elevator is in the receiving position and moving with the elevator to prevent rows from advancing onto the elements when the elevator is in the discharge position; means for moving the elevator section from a unit receiving to a unit discharging position; discharge conveyor members extending into the spaces between said receiving elements, the elements being above the discharge conveyor members when in the receiving position and being below the discharge conveyor members when in the discharge position thereby depositing the rows of units onto the discharge conveyor members; and means for operating said discharge conveyor members to move the row of units in a direction parallel with the length of the unit.

7. A conveyor system for transporting units, comprising: a unit loading section upon which units may be placed in rows and having means for advancing said rows in a direction perpendicular to the length of the rows; an elevator supporting structure; an elevator section mounted on said supporting structure and having spaced rollers mounted parallel to the rows for receipt of rows of units, the rollers being movable from a position adjacent the loading section to a lowered position, the elevator supporting structure having spaced conveyor portions thereon and between which the rollers of the elevator are lowered thereby transferring the rows of units from the rollers to the conveyor portions, said conveyor portions extending beyond the ends of the rollers for conveyance of the rows of units away from the elevator in a direction parallel to the rows; a stop member connected to and movable with the elevator in timed relation to prevent units from passing from the loading section to the elevator when the elevator is lowered; means for raising and lowering the elevator; drive means for operating the conveyor portions; a discharge conveyor section having a portion for receiving units which have advanced from said conveyor portions; and drive means for operating the discharge conveyor section thereby conveying units away from the unit receiving portion thereof.

References Cited in the file of this patent

UNITED STATES PATENTS

| | | |
|---|---|---|
| 1,352,329 | Tschache | Sept. 7, 1920 |
| 1,430,766 | Stebler | Oct. 3, 1922 |
| 1,737,762 | Howe | Dec. 3, 1929 |
| 1,856,733 | Shepherd | May 3, 1932 |
| 1,929,204 | Jeffrey | Oct. 3, 1933 |
| 2,121,135 | Vergobbi | June 21, 1938 |
| 2,773,583 | Rand | Dec. 11, 1956 |
| 2,801,728 | Temple | Aug. 6, 1957 |
| 2,838,161 | Page | June 10, 1958 |